Jan. 17, 1950     J. H. COX ET AL     2,495,092
PNEUMATIC JACK INFLATABLE BY EXHAUST OF AUTOMOBILES
Filed Dec. 28, 1945     3 Sheets—Sheet 1

INVENTORS
JOHN H. COX
AND
RALPH L. MILLER
BY
ATTORNEYS

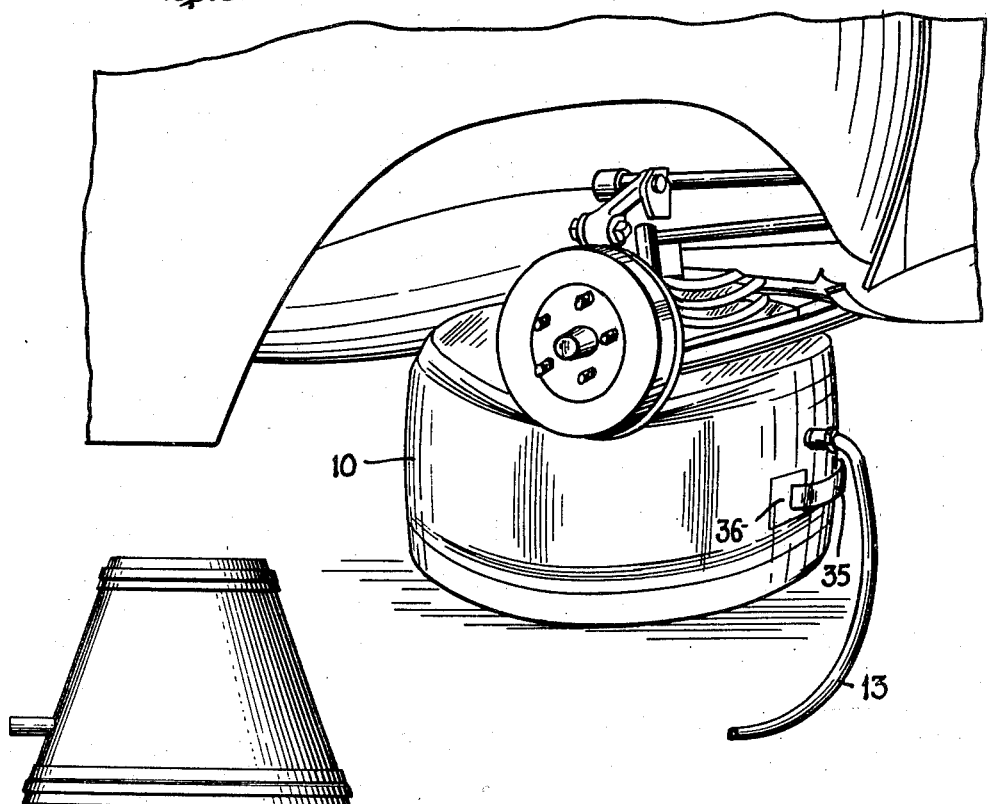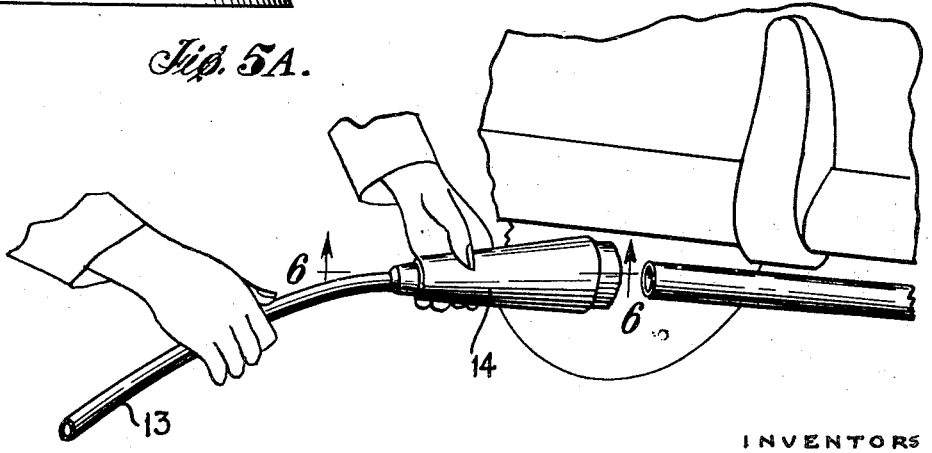

INVENTORS
JOHN H. COX
AND
RALPH L. MILLER

ATTORNEYS

Patented Jan. 17, 1950

2,495,092

UNITED STATES PATENT OFFICE 2,495,092

PNEUMATIC JACK INFLATABLE BY EXHAUST OF AUTOMOBILES

John H. Cox, Seville, and Ralph L. Miller, Akron, Ohio, assignors to The Firestone Tire & Rubber Company, Akron, Ohio, a corporation of Ohio Application December 28, 1945, Serial No. 637,520

1 Claim. (Cl. 254—93)

This invention relates to lifting jacks and more especially it relates to lifting jacks using fluid pressure for operating power.

The invention is of especial utility for use with motor vehicles to lift a wheel preparatory to changing a tire.

An object of the invention is to provide a lifting jack for motor vehicles that has sufficient stability that a wheel or wheels of a motor vehicle may be raised clear of the ground a distance sufficient to change a tire without danger of the vehicle falling off the jack, or the jack falling over, even though the vehicle be on a hill and the jack must rest, or stand, on uneven ground.

Another object of the invention is to provide a jack adapted for use with a motor vehicle in changing tires but additionally is adapted for use in exerting a lifting pressure against any object under which it may be placed.

A further object of the invention is to provide a lifting jack which has a ground surface contact area sufficient to raise a corner, or the end, of a motor vehicle, when the jack rests on or in soft soil, or mud.

Yet another object of the invention is to provide a lifting jack having a very high lift and stability, without its stability being impaired by rough, sloping, or irregular ground surface.

Still a further and important object of the invention is to provide means whereby the engine exhaust may be utilized for inflating and operating a jack.

Yet still another object of the invention is to provide an attachment for a lifting jack which uses fluid pressure for operating power, which attachment will fit over the exhaust end of the exhaust pipe of a motor vehicle, and will make a fluid tight connection with exhaust pipes of various sizes, shapes and stages of deterioration.

Another object of the invention is to provide in combination an inflatable lifting jack and a connection, said connection being easily fitted over the end of a motor vehicle exhaust pipe and is adapted to automatically close about and grip said pipe when internal pressure is built up in the jack.

Of the accompanying drawings,

Fig. 3 is a fragmentary prospective view somewhat enlarged and similar to Fig. 2, except all lines are full and the right front tire is removed to better illustrate the contact of the jack against the undercarriage and the under portion of the automobile;

Fig. 4 illustrates the manual application of the connecting portion of the jack assembly to the tail or exhaust pipe of the automobile;

Fig. 5A is a view similar to Fig. 5 but illustrating a modified shape of a lifting bag;

Figure 1:
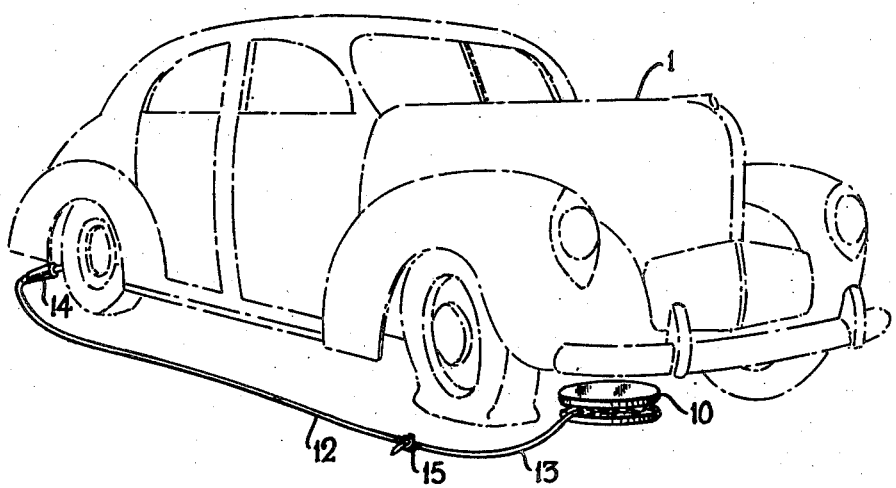
Fig. 1 is a general view showing the invention as used in relation to an automobile, the automobile being shown by dot and dash lines while a lifting jack and its associated parts are shown in full lines, the jack and associated parts being shown in position relative to the automobile just before the jack is inflated to lift the right front tire off the ground.

Referring more particularly to the drawings it will be seen that the device embodying the present invention comprises an inflatable lifting jack, the inflatable member or bag of the jack being referred to generally as 10, said inflatable member being provided with an outlet and inlet stem 11, with lengths of flexible rubber hose 12 and 13, said hose 13 being attached in fluid tight relation to said stem. The combined length of hose 12 and 13 is ample to reach from any part of the front of a car 1 to the rear thereof. The hose 12 terminates at one end in a funnel shape connection 14 adapted to fit over the end of a motor vehicle tail pipe, and to automatically tighten on and about the tail pipe, the connection increasing its grip in accordance with the amount of internal fluid pressure built up in the jack, hose and connection by exhaust fumes from the engine of the automobile as will later be explained herein. Hose 12 and 13 form a continuous hose line attachment to a three way valve 15, the valve being for a purpose to be explained later.

While the invention is disclosed in reference to the changing of a tire of an automobile, it is to be understood that the invention is not to be limited to such use, but may be used in any service wherein the structure of the jack and its mode of operation gives it an advantage over jacks of the common type.

Figure 5:
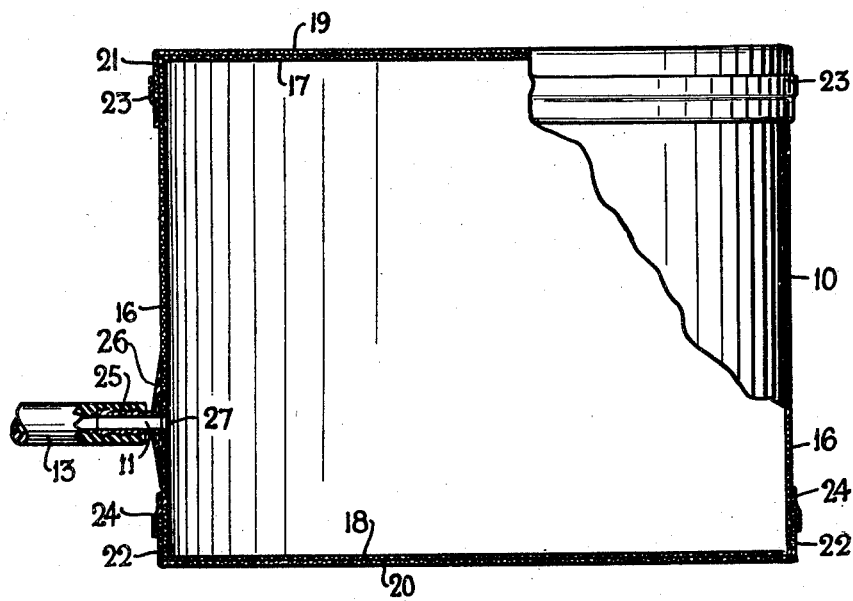
Fig. 5 is a partial sectional view through the lifting jack and the adjacent portion of the hose connection.

The lifting portion 10 of the device when inflated is in the form of a cylinder having closed ends. The walls, including the end portions, are composed of one or more layers, or plies of relatively inextensible, flexible, pliable material which is substantially impervious to the exhaust gases of an automobile engine. The sides of the said bag shown in Fig. 5 consists of one ply 16 of rubberized square woven fabric of 14.72 oz. square yard raw weight, and .036" raw gauge. The fabric is rubberized by any satisfactory method as by frictioning two sides, coat one side to an over-all gauge .054". To construct the portion 10, a strip of rubberized fabric of suitable length and width is provided and before the rubber is vulcanized has its ends spliced together in a lap splice. Next, round disks 17 and 18, of the same material as ply 16, are attached to the outer edges of the side 16 whereby the ends of the cylinder formed by ply 16 are closed. To attach the ends to the side, the inert tackiness of unvulcanized rubber is utilized to hold the ends 17 and 18 in position through the next operation, which consists of applying additional layers, 19 and 20 over end plies 17 and 18 respectively. It is to be noted that the outer surface of disks 16 and 17 are flush with the peripheral edge of ply 16 to which they are attached. Layers or plies 19 and 20 are of the same material as that of plies 16, 17 and 18 and are originally cut out as disks of a diameter somewhat greater than the diameter of the cylinder formed by the side 16. These latter disks are applied centrally to the ends of the cylinder and their over extending edge portions 21 and 22 are turned axially inwardly of the cylinder, that is turned back against the strip 16 to which the said edge portions adhere. Gum strips 23 and 24 are laid over the edges 21 and 22 respectively to seal those edges against leaks. Stem 11 consists of a hollow metal tube 25 with a cured on rubber base 26. The base 26 is attached to the outside of the bag 10 with a hole 27 in the ply 16 aligned with the hole in the stem 11. If found convenient a building form may be used to facilitate the assembly of the plies of bag 10.

Figure 7:
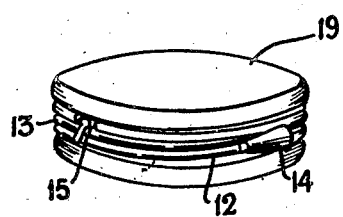
Fig. 7 is a perspective view showing the device as it appears when ready for storage.

After the member or bag 10 has been constructed as set out above it is vulcanized in an open heat, that is, without being placed in a mold. As will be readily understood vulcanizing secures the splices and joints of the members of the bag, and toughens the rubber so that the jack will resist injury even though subjected to rough treatment. However, the condition under which the bag 10 is vulcanized is important as it is through this medium the bag is so formed as to collapse into a predetermined shape with its ends lying closely together with the ply 16 folded therebetween. Preparatory to vulcanizing the stem 11 is connected with a vacuum line not shown and the jack 10 slowly collapsed. As the collapsing proceeds a workman manually presses the sides of the jack radially inwardly between the end portions thereof and with his hands presses the said end portions firmly toward each other so that the layer or ply 16 is formed into compact wrinkles or folds which lie wholly between said ends. The ends are arranged so that they lie substantially in parallel planes separated by a minimum distance practical with the nature of the material composing ply 16. Of course, the jack can be collapsed by simply pressing the ends together allowing the air to escape through the stem 11, but it has been found that the shaping of the collapsed jack can be controlled more accurately by the use of a vacuum as explained above. Where the jack is to be used for changing tires on passenger automobiles, it is of great value to hold the storage space required to a minimum and of a convenient shape. When the bag has been collapsed as explained the stem 11 is plugged or closed in a suitable manner thus preventing air from flowing into the bag and partially expanding it. In its collapsed and plugged condition the bag is vulcanized in that condition in open heat. After vulcanization the stem 11 is opened to the atmosphere but it has been found that the bag does not expand appreciably from its vulcanized shape. Furthermore it has been found that after the bag has been expanded in service and the inflation fluid allowed to escape that it collapses back to its original compact, neat flat shape which is ideal for storage in an automobile trunk, as, collapsed, the jack may be tucked behind a spare tire, laid flat or stood on edge. Also, as will be seen by reference to Fig. 7 the hose 12 may be coiled about the bag portion between the ends thereof; thus the invention provides for the storage or handling of the hose which otherwise would be troublesome.

Figure 6:
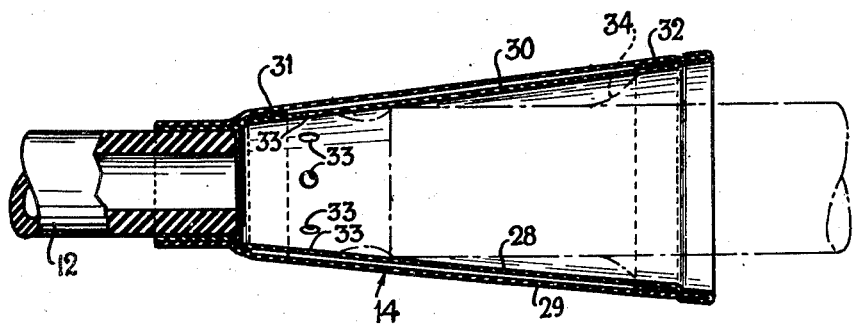
Fig. 6 is a sectional view taken on line 6—6 of Fig. 4 except in Fig. 6 the connection is shown as it would appear connected to the exhaust end of a tail pipe with pressure in the line.

As best shown in Figs. 4 and 6 the connection 14 is in the form of a funnel or is frusto-conical and consists of an inner and outer wall 28 and 29 respectively. These walls are composed of rubberized fabric of the same kind as used in the jack portion of the device. The walls are joined at their end portions and separated intermediate thereof, forming a frusto-conically shaped compartment 30 between the inner and the outer walls 28 and 29. These walls are held apart by end strips 31 and 32 laid between said walls which strips may be of the same material as the walls 28 and 29. At the large end of the funnel the inner wall is doubled back over the edge of the outer wall in order to present a rounded edge to a tail pipe during application of the connection 14 thereto. At the ends of the connection the inner and outer walls are joined in fluid tight relation. In the region of strip 31, holes 33 provide communication between compartment 30 and the inside of the connection. The connection 14 is of such size and shape that its large end will fit over all, or a large range, of automobile tail pipe sizes and shapes while the sides taper toward the small end of the connection so that the exhaust end of tail pipes will bind against the inside wall before the said end projects into the connection beyond the holes 33. After fabrication of the connection 14 from the unvulcanized rubberized fabric it is placed in an open heat and vulcanized. In manufacturing the connection a conically shaped form of card board is used as a building form and the form remains in the connection during its vulcanization, whereby the connection is prevented from becoming distorted. After vulcanization of the connection the form is removed.

The bag 10 and the tail pipe connection 14 are joined and have fluid communication therebetween by means of the lengths of hose 12 and 13 and the valve 15. The hose 12 has an inside diameter of five eighths inch. The small end of the connection 14 fits over the end of hose 12, as best shown in Figs. 6 and 4. In the present case the fit is snug enough to make the joint between the connection 14 and the hose 12 fluid tight, but it is to be understood that cement, or hose clamp, or the like may be used if desired. Similarly the hose 13 is attached to the stem 11, except hose 13 fits over the metal tube 25 of the stem. The hose 12 and 13 are attached to the valve 15 in any ordinary manner.

Figure 2:
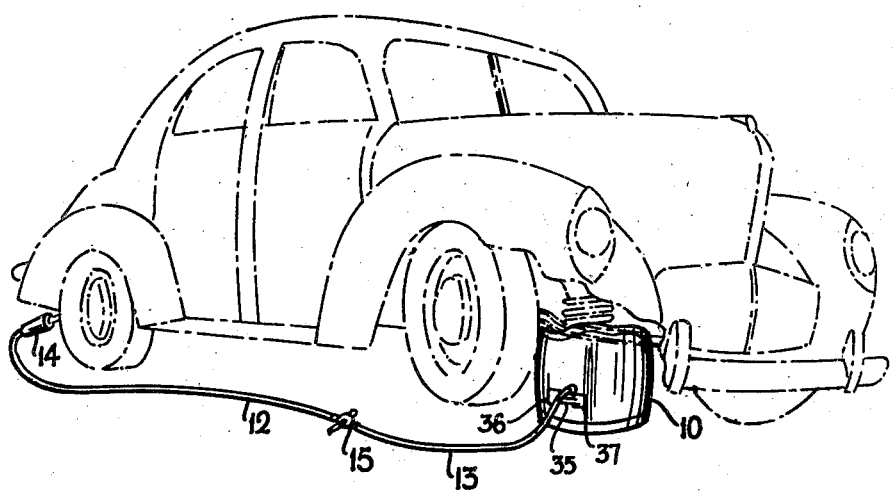
Fig. 2 is the same as Fig. 1 except the jack is shown inflated.

The operation of the device will now be explained in reference to changing a tire of an automobile. Assuming a flat tire has occurred on the right front wheel of an automobile, the driver has only to remove the present device from the automobile trunk, or from wherever carried, unwind the hose 12 and 13 and press the connection 14 over the tail pipe as far as it will go without exerting substantial force. The bag portion 10 is next placed on the ground in front of the automobile and with the driver's foot is given a shove under the front axle, preferably under the right end of the axle, but it need not be placed accurately. After the jack has been shoved under the automobile, as just described, the hose 13 may be used to push or pull the bag to desired position. Next the automobile engine is run at idling speed. The valve 15 is set to permit the exhaust gases to pass from the connection 14 through the hose 12 and 13 into the bag which immediately begins to inflate and contacts the axle and under portions of the automobile. This inflation at first creates a very low pressure in the line, including the compartment 30, the exhaust gases reaching said compartment through holes 33. Pressure in compartment 30 forces the pliable wall 28 radially inwardly about the tail pipe as indicated by dotted line 34 in Fig. 6, causing the connection 14 to grip the tail pipe which grip increases in force as the pressure in the jack increases whereby the connection is prevented from being blow off the said pipe. This is an important feature of the invention and it is pointed out that the pliable wall 28 backed by pressure will conform to elliptical, flattened or irregular shaped tail pipes of a substantial range of sizes. The bag continues to be inflated by the exhaust gases until it has reached its full expansion as shown in Figs. 2 and 3, or has raised the wheel of the automobile off the ground sufficient height for changing the tire. The bag size may be varied; however it has been found that a jack 22 inches in diameter and 16 inches high is satisfactory for use with passenger automobiles. When the proper amount of inflation has been accomplished the valve 15 is adjusted to permit an escape of the inflation gases to the atmosphere at a rate which equals or approximates the speed of inflation from the exhaust of the idling engine. Approximately seven pounds inflation pressure in the present bag is sufficient to lift passenger automobiles for changing tires; however, pressures up to approximately 20 pounds for medium size, and 35 pounds for large size automobiles are possible from the exhaust. Of course, a bag whose walls are strong enough to hold such pressure is practical, but expensive and dangerous if the bag 10 should blow out, and for this reason means for bleeding gases out of the line through the valve 15 is desirable. The present bag is weak enough to become ruptured before its inflation pressure becomes dangerously high.

The invention contemplates the use of a safety valve in combination with valve 15, the pressure line, or the inflatable member 10, whereby a maximum pressure may be established. The safety valve is of particular importance in the event that the inflatable member 10 is built of high tensile fabric for heavy duty work, lifting trucks, heavy cars or other objects. After the tire has been changed, the bag is collapsed by opening valve 15 to the atmosphere. It has been found that the present device operated as described above jacks up an automobile in approximately fifteen seconds and collapses under the weight of the automobile in five seconds or less. Hose 13 has an I. D. of five eighths inch and hose 12 an I. D. of one half inch. Hose 13 permits quick deflation and hose 12 reduces bulk and cost over hose 13. Quick action, and small bulk when not in operation, are desirable and important features of the present invention. It is pointed out that a jack constructed as described above collapses to a height of 2 inches and inflates to a height of 18 inches which is a ratio of expansion of nine to one, as compared to four to one common in the prior art. It is also pointed out that connection 14 may be used, in combination with hose, to discharge exhaust fumes from the tail pipes of automobiles in garages out of the building, or as a means of inflating objects other than lifting jacks.

After the wheels of the automobile rest on the ground again, the connection 14 is removed from the tail pipe and rolled about the body of the bag 10 which has collapsed into the form in which it was vulcanized, due to the elastic nature of rubber and to the folds, formed in the jack during vulcanization, drawing back into original form when the bag is relieved of inflation pressure. The device is next returned to its storage space in the trunk or wherever it is to be carried when not in use. The bag 10 is provided with a ball or strap handle 35 vulcanized to the wall or side 16 in the area adjacent the attachment of outlet 11. Reinforcing patches 36 and 37 are placed under the ends of the strap 35. The patches and handles are attached to the bag before it is vulcanized and all are vulcanized together.

The bag or member 10 illustrated is in the form of a cylinder with a closed end but the invention is not to be limited to such shape since various shapes may be used, as for example, frusto-conical, illustrated in Fig. 5A, which shape imparts additional stability to the jack and is well adapted for use with trucks, and such shape is contemplated for that purpose. It is pointed out, however, that the stability of the cylindrical bag is substantially greater than that of lifting bags of the prior art. Thus the bag 10 at twenty-two inches diameter and sixteen inches height supporting a medium size automobile requires a pull of 390# to pull the automobile off the bag 10 whereas 90# will pull such an automobile off a common metal jack. For other uses, as for example, on a farm, an oblong, or polysided bag may be desirable; accordingly, it is to be understood that the bag portion 10 of the device may be of any desired shape within the spirit of the invention.

Other modifications may be resorted to without departing from the spirit of the invention or the scope of the appended claim.

What is claimed is:

In a lifting jack, the combination of an inflatable member, a connection adapted to fit onto a motor vehicle tail pipe in fluid tight relation therewith, and fluid communication means between said inflatable member and said connection, said tail pipe connection being funnel shape and having at least one inner and one outer ply, said inner and outer plies being separated intermediate their ends defining a compartment therebetween, said compartment having communication with the inside of said connection by means of holes through its inner wall.

JOHN H. COX.
RALPH L. MILLER.

REFERENCES CITED

The following references are of record in the file of this patent:

UNITED STATES PATENTS

| Number | Name | Date |
|---|---|---|
| 1,135,885 | Fawver | Apr. 13, 1915 |
| 1,295,471 | Fleury | Feb. 25, 1919 |
| 1,493,729 | Brown | May 13, 1924 |
| 1,530,577 | Scruby | Mar. 24, 1925 |
| 1,909,890 | Phillips | May 13, 1933 |
| 1,986,273 | Leffingwell | Jan. 1, 1935 |
| 2,140,325 | Morse | Dec. 13, 1938 |
| 2,274,257 | Rockwood | Feb. 24, 1942 |

FOREIGN PATENTS

| Number | Country | Date |
|---|---|---|
| 622,540 | Germany | Nov. 30, 1935 |

Certificate of Correction

January 17, 1950

Patent No. 2,495,092

JOHN H. COX ET AL.

It is hereby certified that errors appear in the printed specification of the above numbered patent requiring correction as follows:

Column 3, line 19, after the word "gauge" insert *of*; line 27, for "inert" read *inherent*; column 5, line 39, for "blow" read *blown*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*